United States Patent
Kounavis (10) Patent No.: US 9,558,389 B2
(45) Date of Patent: Jan. 31, 2017

(54) RELIABLE FINGERTIP AND PALM DETECTION

(71) Applicant: Intel Corporation, Santa Clara, CA (US)

(72) Inventor: Michael Kounavis, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/667,393

(22) Filed: Mar. 24, 2015

(65) Prior Publication Data
US 2016/0283768 A1   Sep. 29, 2016

(51) Int. Cl.
G06K 9/62   (2006.01)
G06K 9/00   (2006.01)

(52) U.S. Cl.
CPC ......... *G06K 9/00006* (2013.01); *G06K 9/6202* (2013.01)

(58) Field of Classification Search
CPC ........ G06F 3/017; G06F 3/0426; G06F 3/012; G06K 9/00355; G06K 9/00389; G06K 2009/00395
See application file for complete search history.

(56) References Cited

U.S. PATENT DOCUMENTS

| | | |
|---|---|---|
| 3,069,654 A | 12/1962 | Hough |
| 8,135,181 B2 | 3/2012 | Zhang et al. |
| 8,638,987 B2 | 1/2014 | Choi et al. |
| 2007/0112747 A1 | 5/2007 | Haigh et al. |
| 2013/0343610 A1 | 12/2013 | Dal Mutto et al. |
| 2014/0307919 A1 | 10/2014 | Yamashita |
| 2015/0193656 A1 | 7/2015 | Kounavis et al. |

OTHER PUBLICATIONS

Kenji Oka et al., Real-Time Fingertip Tracking and Gesture Recognition, IEEE Computer Graphics and Applications, Nov./Dec. 2002, pp. 64-71.*
"International Application Serial No. PCT/US2016/019336, International Search Report mailed Jun. 8, 2016", 3 pgs.
"International Application Serial No. PCT/US2016/019336, Written Opinion mailed Jun. 8, 2016", 7 pgs.

(Continued)

*Primary Examiner* — Brian P Werner
(74) *Attorney, Agent, or Firm* — Schwegman Lundberg & Woessner, P.A.

(57) ABSTRACT

Embodiments of a system and method for detecting a palm of a hand using an image are generally described herein. A method for detecting a palm of a hand may include determining a plurality of cumulative distance values from pixels in a set of image pixels to pixels in a plurality of finger template matches, wherein the set of image pixels includes a set of image pixels on detected edges in the image. The method may include selecting a set of finger template matches from the plurality of finger template matches, corresponding to a set of smallest cumulative distance values from the plurality of cumulative distance values. The method may include refining the set of finger template matches to create refined finger templates, bundling refined finger templates to create a bundle of refined finger templates, and verifying that the bundle of refined finger templates includes a valid palm detection.

25 Claims, 6 Drawing Sheets

(56) References Cited

OTHER PUBLICATIONS

Ballard, D. H, "Generalizing the Hough transform to detect arbitrary shapes", Pattern Recognition, 13(2), (1981), 111-122.

Bhuyan, M. K. et al., "Fingertip Detection for Hand Pose Recognition", International Journal on Computer Science and Engineering, 4(3), (Mar. 2012), 501-511.

Chaudhary, Ankit, et al., "A Vision-Based Method to Find Fingertips in a Closed Hand", Journal of Information Processing Systems, 8(3), (Sep. 2012), 707-716.

Datta, Ankur, "Chamfer Matching & Hausdorff Distance", Carnegie Mellon University, [Online]. Retrieved from the Internet: <URL:https://www.cs.cmu.edu/~efros/.../0301Comparison.ppt>, (Accessed: Jul. 18, 2016), 43 pgs.

Duda, Richard O, et al., "Use of the Hough Trasformtion to Detect Lines and Curves in Pictures", Communications of the ACM, 15(1), (Jan. 1972), 11-15.

Fernandes, Leandro A.F, et al., "A General Framework for Subspace Detection in Unordered Multidimensional Data", Pattern Recognition, 45(9), (Sep. 2012), 3566-3579.

Guo, Siyu, et al., "An improved Hough transform voting scheme utilizing surround suppression", Pattern Recognition Letters 30, (2009), 1241-1252.

Hart, Peter E, et al., "How the Hough Transform Was Invented", IEEE Signal Processing Magazine, 26(6), (Nov. 2009), 18-22.

Kang, Sung Kwan, et al., "Color Based Hand and Finger Detection Technology for User Interaction", International Conference on Convergence and Hybrid Information Technology,, (Aug. 2008), 229-236.

Kosecka, J, "More on template matching", George Mason University, (Accessed: Jul. 18, 2016), 11 pgs.

Krejov, Philip, et al., "Multi-touchless: Real-Time Fingertip Detection and Tracking Using Geodesic Maxima", 10th IEEE International Conference and Workshops on Automatic Face and Gesture Recognition, (Apr. 2013), 1-7.

Olson, Clark F, "Constrained Hough Transforms for Curve Detection", Computer Vision and Image Understanding, 73(3), (Mar. 1, 1999), 329-345.

Park, Jong-In, et al., "A Robust Fingertip Detection Algorithm for Mobile User Interfaces", International Journal of Bio-Science and Bio-Technology, 5(3), (Jun. 2013), 69-78.

Raheja, Jagdish Lal, "Fingertip Detection: A Fast Method with Natural Hand", International Journal of Embedded Systems and Computer Engineering, 3(2), (2011), 85-88.

Zhang, Qiang, et al., "Efficient edge matching using improved hierarchical chamfer matching", IEEE International Symposium on Circuits and Systems, (May 2009), 1645-1648.

Zhang, Zhengyou, "Iterative Point Matching for Registration of Free-Form Curves and Surfaces", International Journal of Computer Vision, 13(2), (1994), 119-152.

* cited by examiner

RELIABLE FINGERTIP AND PALM DETECTION

BACKGROUND

Image-based solutions for gesture recognition or hand pose detections are becoming more sophisticated every year. Current solutions may include well-known approaches, such as using a Haar classifier, but may not work well with an open palm pose because the open palm pose may expose the background between fingers. Other solutions use skin color, but may suffer from reduced detection rates when a hand is in front of a face, other skin areas, or similarly colored backgrounds. Still other solutions may rely on a static camera assumption for background subtraction, which requires a known static camera and may be unrealistic or ineffective for certain devices. In other solutions, a depth camera may be used, which may require a high power usage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As described above, current image-based solutions for gesture recognition or hand pose detections may have some drawbacks. In an example, a technique may include edge detection, fingertip detection, gesture recognition, open palm detection, or template matching. In this disclosure a technique is presented that may support open palm detection and fingertip contour line identification. This technique may impact a range of products from laptops, PCs, or servers to ultrabooks, tablets or smaller (e.g., Internet-of-Things) devices. The technique may include enhancing the robustness of gesture recognition applications. The technique may be realized in software or hardware, or combinations thereof.

In an example, a technique may include introduction of a multi-stage template matching process or a greedy algorithm for bundling template matches together into candidate fingertip detections.

A Hough transform is a previously known technique for template matching. The Hough transform maps the set of lines that may pass through a point in an image to a curve in an equivalent transform space. The Hough transform process is repeated for all edge points in an input image and a voting scheme detects the points in the transform space with the largest number of votes. These points correspond to potential lines in the input image. The Hough transform may be generalized to arbitrary shapes.

In a Hough transform, a separate search is performed for each edge pixel on a template parameter space. A technique proposed herein may include performing such a search once. Performing the search once may improve functioning of a computer by using less processing power, reducing heat, allowing for additional processing steps to be done in a specified period of time, etc. In another example, a search may be split into stages.

Even though a technique performing a single search includes performing a complex template search, the technique may be done in real time. The space of possible templates may be large. For example, for finger shapes described below or Video Graphics Array (VGA) resolution, the space may include 1.3 billion templates defined over coarsely quantized parameters and associated with template location, rotation, size or individual curve properties. In a Hough transform, a search may need to be repeated for approximately 10,000 to 50,000 edge pixels per image. In the present technique, one search may be used for the edge pixels in an image. Running the search once may reduce the iterations of the search from a possible number of 10,000-50,000 to one. In another example, the technique may split the search into stages. For example, in a first stage location, rotation or size parameters may be considered. In subsequent stages the technique may search the space of individual curve properties. This may reduce the number of templates to be searched from billions to approximately 300,000 for the VGA resolution.

Another example of previously used schemes are Chamfer Matching-based schemes. The Chamfer Matching-based schemes typically split a template search process into multiple stages, but they do not use different thresholds in each stage. In an example, a new technique may include a plurality of thresholds, which are used for pruning templates after a plurality of stages compete. A first threshold may be used in a first stage, which may be tighter than a second threshold used in a second stage. Using a different threshold for a stage, the technique may process fewer templates in each stage than previous techniques. In another example, the technique may keep the number of templates small by performing merging operations after each stage. For example, templates that are similar to each other may be merged together.

Other methods may address fingertip detection in different ways. For example, a method may identify fingertips as geodesic maxima, obtained from depth. However, the use of depth data may require significant power usage. Other methods may locate fingertips from properties of skin masks that result after a skin detection process has separated a hand region from background regions. In an example, a technique described herein may do fingertip detection without using skin information due to the possible skin collisions (e.g., between skin on fingers and skin on other body parts or skin color similar to background color).

Yet another method may do edge detection by applying Canny on each of the R, G, and B (red, green, and blue) channels separately. The method may include detecting fingertips from edge data using a Haar classifier and Adaboost. However this method may only use R, G, and B channels. The technique described herein may use many more channels than R, G, and B for robustness. In an example, fingertips may not be detected using a Haar classifier and Adaboost and instead may be detected using a novel template matching process.

Figure 1:
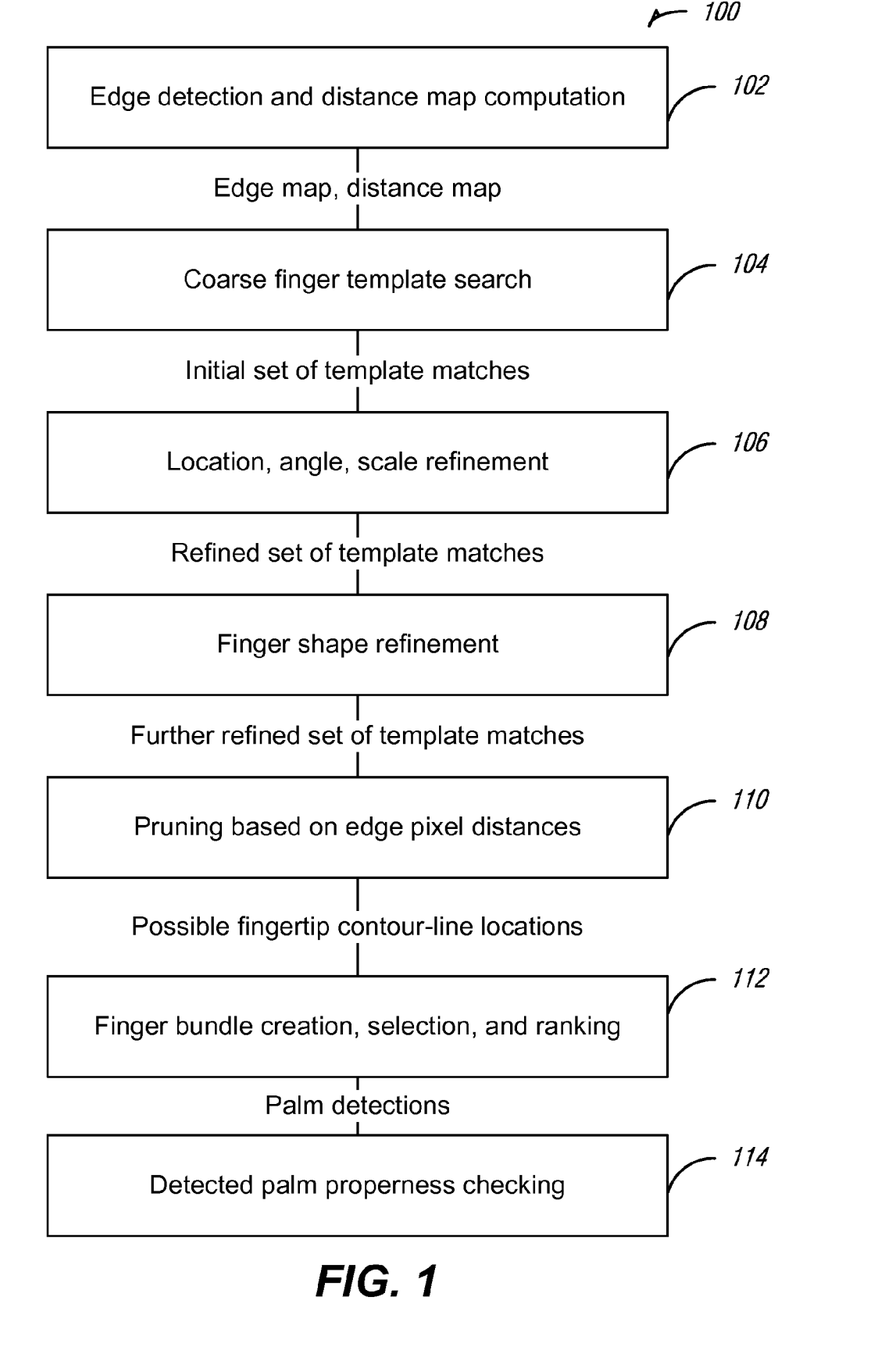
FIG. 1 illustrates generally a flowchart showing a technique for open palm detection in accordance with some embodiments.

FIG. 1 illustrates generally a flowchart showing a technique 100 for open palm detection in accordance with some embodiments. The technique 100 may include an operation 102 to detect edges in an image and perform a distance map computation for pixels in the detected edges. Operation 102 may have an output of an edge map and a distance map. In an example, the technique 100 includes operation 104 to perform a coarse finger template search using the edge map and distance map. Operation 104 may have an output of an initial set of template matches. The technique 100 may include an operation 106 to perform location, angle, or scale refinement of the initial set of template matches. The technique 100 may continue with a refined set of template matches that may be modified in an operation 108. Operation 108 may include finger shape refinement resulting in a further refined set of template matches. In an example, technique 100 includes an operation 110 to prune the refined template matches using edge pixel distances, resulting in possible fingertip contour-line locations. The technique 100 may include an operation 112 to create, select, and rank finger bundles. Operation 112 may result in detection of a palm. The technique 100 may include an operation 114 to perform detected palm properness checking.

In an example, edge detection and template matching may be applied for finding possible templates that match with four fingertip contour lines (e.g., index, middle, ring, or pinky). A bundling technique may be applied for combining highly probable fingertip detections into open palm detections. Such a process may return the best matching bundles ranked according to some color and distance-based metric. In another example, a custom heuristic may be used that finds bundles of four finger templates, ranks them according to some score based on color homogeneity or edge pixel distance, and returns the bundles that most likely represent the open palm pose.

In a specific example, more than 95% of examples may include the best matching bundle ranked first among the bundles returned by a technique using the examples above. In other examples, the best matching bundle may be returned as well, and ranked among the best 10-20 bundles. The technique may return false positives, for example, false positives may be found among the best 10-20 bundles together with correct detections. However, the false positive rate is small (<5%). Additional heuristic techniques may be employed in order to distinguish between true detections and false positives in returned bundles, such as landmark-based detection. A technique may include code written in C or C++.

The technique described above performs reliable pose detection using edge data. In an example, the technique may be used as a building block in other techniques. For example it may be used for fingertip detection in smaller windows that have been classified as candidate pose windows by other classifiers. This technique may also be suited for hardware acceleration. For example, the technique may run in real-time. For example, a VGA frame may be processed in a few seconds in a single 2.6 GHz Sandy Bridge core. In another example, processing a VGA frame may be parallelizable and suitable for GPU or custom hardware acceleration (e.g., convolution, template matching, bundling acceleration, etc.). Other real-time examples may include straightforward engineering extensions (e.g., using SIMD SSE/AVX instructions, multiple cores, GPU EUs, or hardware accelerators).

A technique may consist of several operations. A first processing operation may include an edge map creation stage and a distance map creation stage. The distance map may be created directly from the edge map. The edge map may be created from one or more of seven separate color channels (i.e., R, G, B, Y, Cr, Cb, and S) in order to minimize the probability of losing finger edge information due to grayscale value collisions between the hand and the background. While such collisions may occur when less than seven of the above channels are used, they may not appear if all seven channels contribute to the edge map. In an example, a database of about 80 images depicting the open palm pose may be used. In an example, after the edge map is created a distance map may be created. The distance map may annotate a pixel in the image with a distance value denoting the distance between the pixel and a closest edge pixel.

The distance map may be used as input to a multi-stage template matching process. The template matching stage may include a first broad search operation where a finger template is matched with the edge and distance maps at different locations, angles or sizes. The first stage may return a number of candidate template configurations (e.g., associated with a plurality of locations, angles, or sizes) determined from a cumulative distance between edge pixels of the finger template and edge pixels of the map. For example, a cumulative distance may include any distance computed using any mathematical process that operates on one or more pixel distance values. In an example, there may be between 50,000 and 200,000 pixels. A second stage may refine the template configurations by determining optimal finger shape parameters and may also include optimal location, angle or size values. The second stage may include a consolidation operation where template configurations that are close to each other are merged. A number of template configurations with very small distance from edge pixels may be selected from the second stage. In an example, the number of these configurations may be 50 to 100. A third operation may run a greedy algorithm, which first computes bundles of finger templates that may constitute the fingertip contour lines of a candidate open palm pose. The bundles may be ranked according to a combined color homogeneity or edge distance metric. In an example, a number of highest ranking bundles may be returned by the greedy algorithm. In a specific example, almost 100% of samples may include a bundle that best describes the location of the fingertip contour lines in the first 10-20 bundles returned by the greed algorithm when an open palm is present in a frame. In another specific example, more than 95% of the samples may include the best bundle ranked first among those returned by the greedy algorithm.

Figure 2:
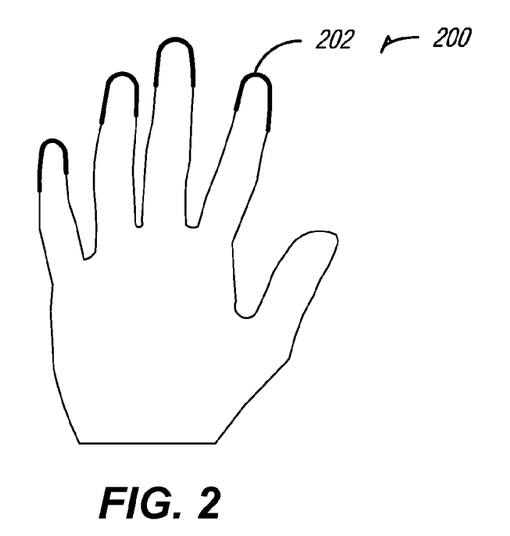
FIG. 2 illustrates generally an image with identified finger templates in accordance with some embodiments.

FIG. 2 illustrates generally an image 200 with identified finger templates (e.g. 202) in accordance with some embodiments. The image 200 includes an example of an identified finger template 202. In an embodiment, edges may be detected in the image 200. For example, the edges may be detected in the image 200 using color channel data. The color channel data may include one or more of seven color channels, such as red, green, blue, y-luminance, chromatic red, chromatic blue, or saturation. In another example, a distance map may be determined for a plurality of pixels on the detected edges of the image 200. The distance map may include proximity information for the plurality of pixels relative to each other. The identified finger template 202 may be determined by determining a cumulative distance from pixels in a first group of the plurality of pixels on the detected edges to sets of pixels in finger templates.

Figure 3A:
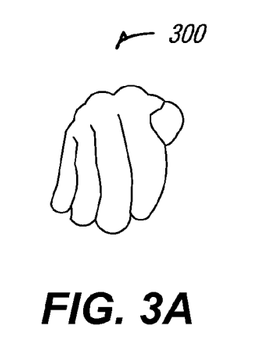
FIGS. 3A-3C illustrate generally diagrams of images in accordance with some embodiments.
Figure 3B:
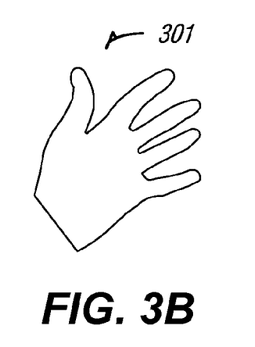
Figure 3C:
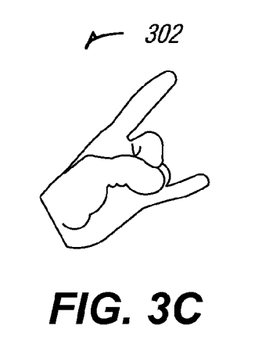
Figure 3D:
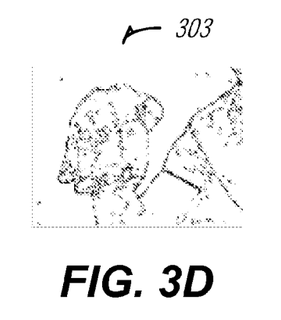
FIGS. 3D-3F illustrate generally diagrams of edge detection in images in accordance with some embodiments.
Figure 3E:
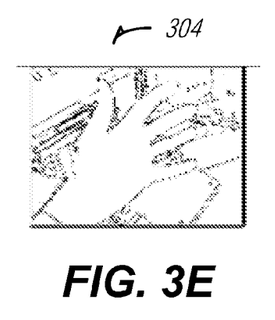
Figure 3F:
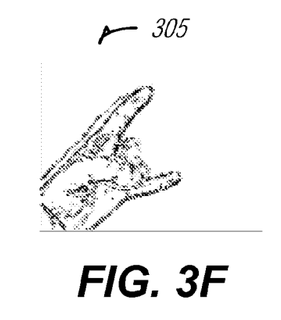

FIGS. 3A-3C illustrate generally diagrams (e.g., 300, 301, or 302) of images in accordance with some embodiments. FIGS. 3D-3F illustrate generally diagrams (e.g., 303, 304, or 305) of edge detection in images in accordance with some embodiments. The diagrams of edge detection 303, 304, and 305 correlate to the diagrams of images 300, 301, and 302, respectively. In an example, the diagrams (e.g., 303, 304, or 305) in FIGS. 3D-3F may be inverted for ease of viewing (e.g., white dots on a black field).

In an example, an edge map is created to detect edges in an input image that may facilitate template matching for detecting fingertips. Edge detection may be done to define shapes to be detected (e.g., finger shapes) that may be distinguished from background shapes or pixels independent of the background color properties. When using a single grayscale channel, this process may be difficult. In an example, edge information based on many different grayscale signals may be used. The grayscale signals may be associated with different color properties of the image.

An edge map creation technique may include a many-channel variant of a Canny edge detector. In an example, seven color channels may be used. The seven channels may include Red (R), Green (G), Blue (B), Y-luminance (Y), Chromatic red (Cr), Chromatic blue (Cb), and Saturation (S). Each channel may return a separate edge map. A pixel in the final map may be considered an edge pixel if it is an edge pixel in at least one of the maps returned by the seven input channels. The final map may be computed by performing a logical OR operation between the edge maps returned by R, G, B, Y, Cr, Cb, and S.

In an example, fixed thresholds to distinguish between 'thick edges' (e.g., pixels that are very strongly considered edge pixels) and 'thin edges' (e.g., pixels that may be edge pixels in a final map) may be used. In another example, dynamic thresholds determined from spatial derivative magnitude histograms may be used. Using dynamic thresholds may allow tracking of meaningful edge pixels more accurately in each of the channels, using different thresholds per channel.

In another example, a technique may apply a hysteresis process for finding edge pixels of each map. This approach may be similar to a Canny technique or may use thresholds computed dynamically from spatial derivative histograms. In yet another example, a technique using the hysteresis may extend the notion of neighboring candidate edge pixels to include pixels in neighborhoods larger than the closest 3×3 windows. For example, pixels that have gradients perpendicular to a line that connects these pixels with a central pixel may be considered. In an example, edge filters coming from normalized Gaussian Derivatives with wider scale values than Sobel edge detectors (e.g., what would be used for Canny) for noise reduction may be used. These filters may be applied on appropriately blurred versions of the input image.

In an example, a distance map may be determined using a simple proximity information broadcasting technique. In other examples, alternative techniques such as Voronoi diagram-based techniques may be used.

Figure 4:
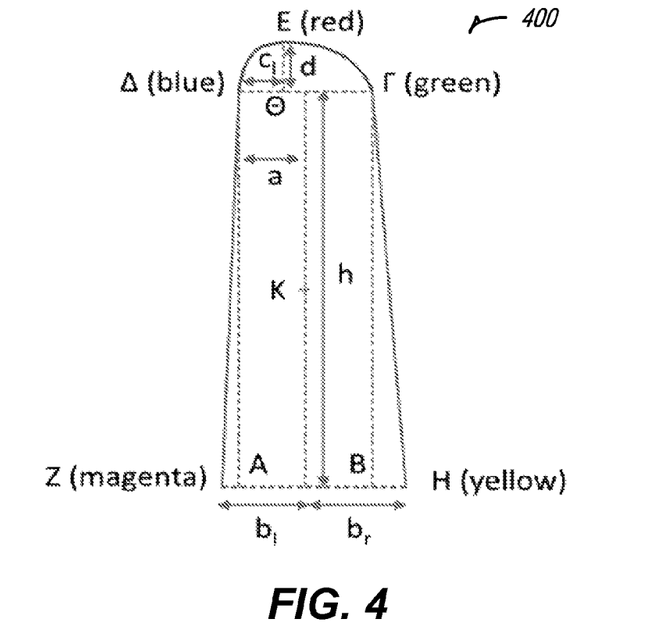
FIG. 4 illustrates generally a finger template in accordance with some embodiments.

FIG. 4 illustrates generally a finger template 400 in accordance with some embodiments. A technique may include a template matching operation, which may place a finger template 400 on top of a distance map at different locations. The technique may include calculating a cumulative distance between edge pixels of the finger template 400 and edge pixels of the distance map. In an example, the finger template 400 may include a shape that resembles a fingertip contour line. The shape may consist of two line segments and two ellipse segments. The finger template 400 may be parameterized by six parameters, such as a, h, bl, br, cl, and d shown in FIG. 4. For example, these parameters may determine the line and ellipse segment endpoints shown in FIG. 4. Parameters a, bl, br, cl, and d may also be expressed in terms of their ratios over parameter h. Setting parameter h to a different value each time, different scaled versions of the same finger template 400 may be generated. In this manner, parameters a, bl, br, cl, and d indicate a shape of the finger template 400 whereas parameter h indicates its size.

The finger template 400 may be rendered using its six parameter values and location information. During rendering the technique may determine coordinates of the pixels that constitute the drawn line and ellipse segments of the template. The finger template 400 may be rendered at different locations rotated by different angle values. The finger template 400 may be associated with location information, size information and rotation information. The combination of location, rotation and size information may include a template configuration. Scale of a template may include the size of the template. The scale of a template may be denoted by the value of the parameter h. To perform template matching, the coordinates of the pixels of a template configuration may be used for obtaining information about distances between these pixels and the edge pixels in an input edge map. This information may come from a corresponding distance map. The metric used for determining the proximity of a template configuration to an actual contour in the input edge map may include an average squared distance of the pixels in a configuration and the closest edge pixels in the map. Template configurations may also be referred to as template matches.

In an example, a template matching operation may include a broad search for candidate template configurations. During this broad search, a single finger shape may be used. This shape's parameters may represent expected values for parameters shown in FIG. 4, (e.g., a, bl, br, cl or d) that may come from a large training set. In an example, during the broad (coarse) search the image width and height may be divided into intervals of pixels (e.g., 8 pixels). The scale space for parameter h, (e.g., from h=16 to h=80 pixels) may be similarly divided into intervals of pixels (e.g., 8 pixels, 16 pixels, etc.). The space of rotation values may be between −0.57 to 0.57 radians, in an example, and may be divided into intervals of radians (e.g., 0.08 radians, 0.19 radians, 0.26 radians, etc.). Other embodiments may divide the search space into different intervals. A combination of location, scale and angle values coming from the aforementioned intervals may be considered a candidate template configuration. The configurations that pass onto the next stage may include those that have an edge pixel distance below a threshold. The threshold may be expressed as a function of the scale parameter of a finger. In an embodiment the threshold is equal to the scale of the finger shape times a factor. For this operation, a factor or an absolute threshold may be determined through experimentation. A factor from the maximum distance between two finger configurations that lie inside the same intervals of the coarse search may be used. The total number of configurations under consideration for the VGA resolution may include a maximum (e.g., 302,000). In some embodiments, this part of the technique may be split between different processing units for acceleration. Another example may involve pre-determining template configurations associated with possible sizes or angle values, for example around a coordinate center (0,0). In this example, determining the proximity of a configuration to an actual contour line may involve translating a pre-determined configuration from the coordinate center (0,0) to a destination location and computing the value of a distance metric. In an example, pre-determining template configurations may include pre-computing the coordinates of the pixels of a finger template.

In an example, template matching may include a refined search. The refined search may include further refining the configurations that pass the coarse search using a series of scale, angle, or location refinement operations. In the refined search, a single parameter value may be refined for an iteration (e.g., scale, angle, location x, location y, or the like refinements). Refinement may include taking a parameter value, (e.g., scale=s0) and using two additional values that differ by a predetermined quantity. For example, the quantity may equal to half the interval used by the previous stage (e.g., if a scale of 8 pixels was used in a previous refinement or initial matching, 4 pixels may be used in a next refinement). If the scale interval used in a previous stage is $\Delta s$, the two additional values may be $s0+\Delta s/2$ and $s0-\Delta s/2$. In an example, the coarse search $\Delta s$ may equal 8 pixels. The refinement operation may replace the value which is being refined by the one that results in the best edge pixel distance from among s0, $s0+\Delta s/2$ and $s0-\Delta s/2$. The refined search may involve a number of refinement cycles (e.g., 2, 3, 4, etc.). A cycle may involve separate refinement operations, (e.g., scale, angle, location x, location y, or the like refinements). In an example, a cycle may use intervals which are half the values of the intervals used by the previous cycle. For the scale, location x, or location y parameters, for example, the intervals used may be equal to 4, 2 and 1 pixels for three cycles. For the rotation angle parameter the intervals used may be 0.095, 0.0475 and 0.02375 radians for three cycles.

At the end of the refined search, configurations with edge pixel distance below a second threshold may be pruned. A scale-relative threshold may be used in this stage as previously. This second threshold may be tighter than the one used by the coarse search and determined experimentally using a similar methodology. The total number of configurations under consideration in this stage is may be in the order of 100,000 for VGA resolution. The processing workload may be split between different processing units. The template matching operation may include using configurations which are similar to each other and merging them. In an example, similar may mean that the scale-relative difference between the scales, the x center coordinates and the y center coordinates of configurations are smaller than a threshold each. In another example, the absolute difference between the configurations angles may be smaller than a threshold. In an example, the number of configurations after merging may include 10,000-30,000 configurations for the VGA resolution.

In an example, template matching may include a shape refinement operation. In the previous operations, a plurality of configurations were associated with finger shape parameters (e.g., a, bl, br, cl, and d values) of a single shape. In this operation, the shape of a configuration may be considered against alternative finger shapes coming from a database of artificial fingers. The artificial finger shapes may be produced through machine learning training. In an example, an Expectation Maximization (EM) technique may be used for training. In another example the k-means or on-line k-means clustering techniques may be used for training. To support training, images with finger shapes may be annotated with colors in the endpoints of ellipse line segments of fingers, as shown in FIG. 4. In the shape refinement operation, the finger shape of a configuration may be replaced by one that results in the best edge pixel distance. A artificial finger database may be used. In an example, an artificial finger database may contain a few hundred finger shapes (e.g., 300, 400, 500, etc.). The finger shapes may be produced from a smaller number of real finger shapes (e.g., less than 100) coming from a few individuals (e.g., four in an example). A database produced from a few individuals with substantially different finger shapes (e.g., one or more males, one or more females, and one or more children) may be sufficient for returning good finger detections. Due to the fact that the number of finger shapes used in this operation is much larger than one, the optimization of pre-determining finger templates used in the coarse and refined searches may not be easily applied. Instead, artificial finger shapes may be grouped into families based on their similarity. Finger shape families may be further organized into family trees. Using family tree information may substantially reduce the time of the finger shape evaluation process by comparing a template with those of the closest family in the family tree. In an example, the operation may include a third pruning of template configurations using an even tighter threshold than the previous two thresholds. In another example, the third pruning may use an absolute (e.g., scale-invariant) threshold. Such pruning may be followed by a second merging of similar template configurations. The resulting configurations may, for example, be in the order of 50-100 configurations. Shape refinement may also be split between multiple processing units.

In an example, a processor may determine a first set of finger template matches by determining a cumulative distance from pixels in a first group of the plurality of pixels on the detected edges to sets of pixels in finger templates. For example, the first set of finger template matches may include parameters indicating a finger shape. In another example, the cumulative distance may include an average squared distance of pixels in the first set finger template matches to the plurality of pixels on the detected edges. In yet another example, the first set of finger template matches may be determined by determining that the cumulative distance between a plurality of pixels in a template match, and image edge pixels is less than a maximum threshold. To refine the first set of finger template matches, the processor may use scale, angle, or location parameters. In an example, the processor may replace the shape of a first finger template with a refined finger shape.

FIGS. 5A-5D illustrate generally heuristics for detecting a valid palm of a hand (e.g., 500A-500D) in accordance with some embodiments. In the examples shown in FIGS. 5A-5D, heuristic techniques may include detecting a palm. In an example, a technique may include configurations that are likely to represent different fingers of the same open palm pose are bundled together. Configurations may represent one of the four fingers (e.g., index, middle, ring, or pinky). The thumb may be excluded from the search due to the choice of the finger shapes used in the previous stages. In another example, the thumb may be included as a fifth finger. To group finger templates into a bundle, a number of different heuristics may be applied. In an example in FIG. 5A, a heuristic may include determining whether fingers of a hand have a similar size. In another example in FIG. 5B, a heuristic may include determining whether fingers of a hand do not overlap. In this example, the heuristic is used for detecting the open palm pose. In yet another example, a heuristic may include determining that successive fingers are not too far away from each other. Another heuristic may include the angle between successive fingers not being too wide. A heuristic may include a finger not being directly below another finger in the open palm pose. The technique of employing a plurality of heuristics, such as those described above for FIGS. 5A-5D for detecting a valid palm of a hand, are generic and applicable to a plurality of hand poses, including but not limited to the open palm pose, the V-shape pose, the index finger raised pose and the like. The discussion that follows, focuses on the open palm pose, but any hand pose may be detected using heuristics.

A heuristic may include a scale heuristic. The scale heuristic may include determining similarity of finger lengths on two fingers of a bundle. The scale heuristic may include computations on a first finger scale value s1 502A and a second finger scale value s2 502B on FIG. 5A. In an example, the scale heuristic may include a determination (e.g., |s1−s2|/max(s1, s2)) determined by the scale values s1 502A and s2 502B of two fingers. In this example, the scale heuristic may determine whether the value |s1−s2|/max(s1, s2) is smaller than a threshold in order for the fingers to be considered part of the same bundle. A second heuristic is a minimum or maximum distance heuristic. In an example, the minimum or maximum distance heuristic may include a ratio of the distance of the centers of two fingers d 504 over the maximum width a 506 on FIG. 5B. In an example, two fingers may be in a bundle if the ratio of the two fingers exceeds or falls below a threshold.

Figure 5A:
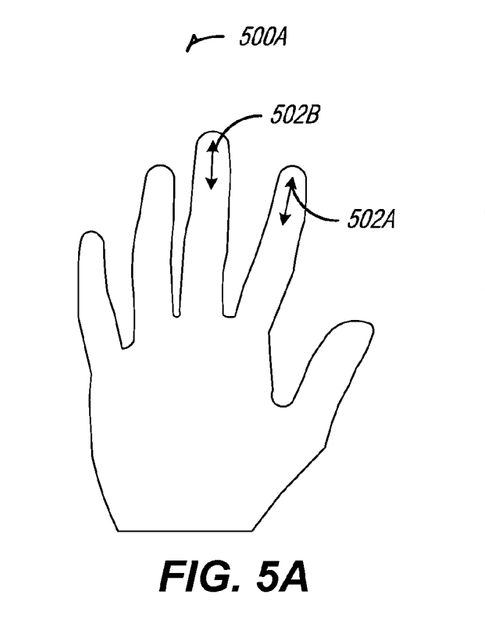
FIGS. 5A-5D illustrate generally heuristics for detecting a valid palm of a hand in accordance with some embodiments.
Figure 5B:
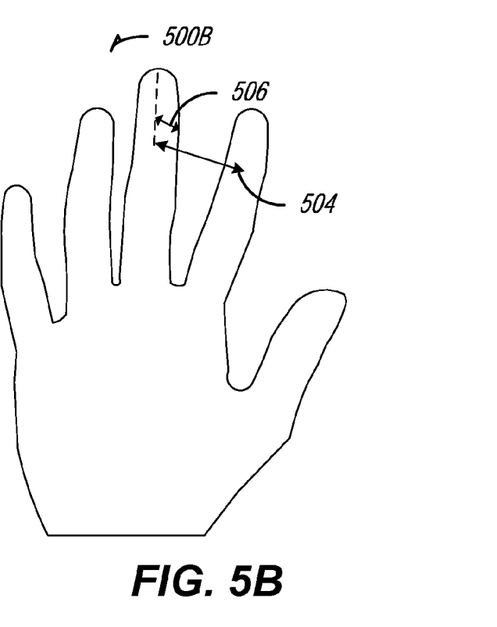
Figure 5C:
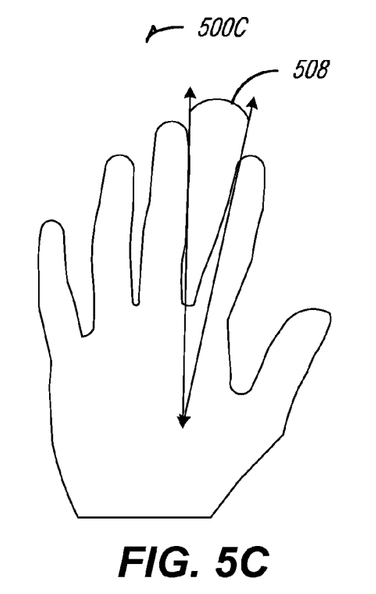
Figure 5D:
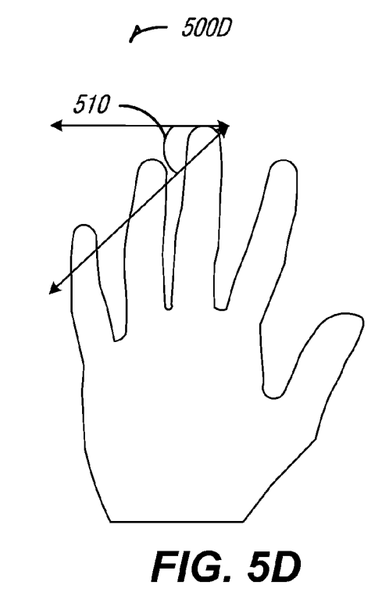

In an example, an 'angle-between-fingers' heuristic may include determining if an angle 508 on FIG. 5C between possible sequential fingers, determined through the template matching process, is smaller than a threshold. If the angle 508 falls below the threshold, the fingers may be part of the same bundle. In an example, an 'angle-along-fingertips' heuristic may include determining if an angle 510 on FIG. 5D between a horizontal line and a line that connects two fingertips is smaller than a threshold. If the angle falls below the threshold, the fingers may be part of the same bundle.

Using a heuristic or a plurality of heuristics, a technique may greedily determine possible bundles of two fingers. The technique may also determine three fingers or four fingers that may be part of a bundle. In an example, a finger may be considered part of a bundle if it satisfies the scale, minimum distance, maximum distance, angle-between-fingers, or angle-between-fingertips heuristic with a member of the bundle. In an example, one or more of the heuristics may be used together with different thresholds. In another example, to be a member of a bundle, a finger may need to satisfy thresholds for a heuristic with another finger, two other fingers, all other fingers, etc. In yet another example, a finger is considered part of a bundle if it satisfies the scale, minimum distance and angle-between-fingertips heuristic with all members of the bundle, and the maximum distance and angle-between-fingers heuristic with at least one member of the bundle.

In an example, a technique may include bundling a first finger template with three other finger templates using a heuristic to create a valid open palm detection. The open palm detection technique may include a scale heuristic, a minimum distance heuristic, a maximum distance heuristic, an angle between a first finger template and a second finger template heuristic, or an angle between a first fingertip in a first finger template and a second fingertip on a second finger template heuristic. In another example, the technique may include determining a plurality of other finger templates by iterating the operations used to determine a first finger template on a plurality of groups of a plurality of pixels, and wherein a plurality of finger templates may comprise a first finger template from a first group of a plurality of pixels, a second finger template from a second group of the plurality of pixels, a third finger template from a third group of the plurality of pixels, and a fourth finger template from a fourth group of the plurality of pixels.

The heuristics may be used to determine if a palm detection is proper, such as by using relative heights of consecutive finger templates. In another example, to determine that the palm detection is proper, the relative heights of consecutive finger templates may include a sequence of an increase in height followed by two decreases in height or two increases in height followed by a decrease in height. In an example, the palm detection may be considered proper if a color homogeneity metric within each finger template in a detection exceeds a first threshold. In another example, the palm detection may be considered proper if a color homogeneity metric computed from two or more finger templates exceeds a second threshold.

Figure 6A:
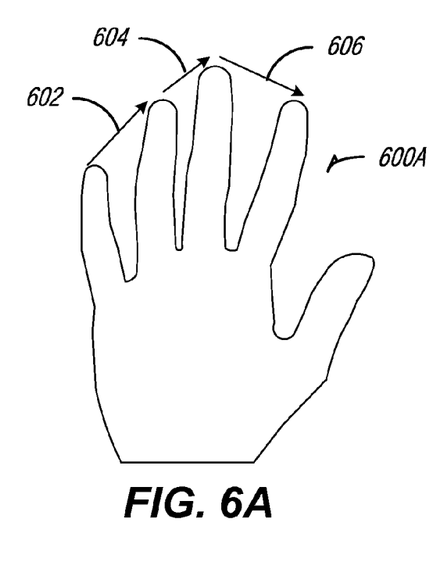
FIGS. 6A-6B illustrate generally open palm models used for properness checking in accordance with some embodiments.
Figure 6B:
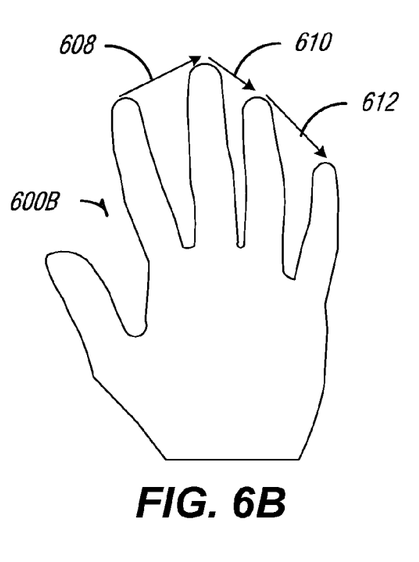

FIGS. 6A-6B illustrate generally open palm models 600A and 600B used for properness checking in accordance with some embodiments. In an example, open palm model 600A may represent a left hand. In another example, open palm model 600B may represent a right hand. Properness checking may include determining if an open palm model represents a left hand or a right hand.

A bundle may be checked for 'properness.' In an example, a bundle may be proper if y-coordinates of the bundle's successive fingertips are ascending twice and descending once. In another example, a bundle may be proper if y-coordinates of the bundle's successive fingertips are ascending once and descending twice. For example, in the open palm model 600A, a left hand bundle may include y-coordinates of the left bundle's successive fingertips ascending twice and descending once. The open palm model 600A may include y-coordinates of the left bundle's successive pinky and ring fingertips ascending along arrow 602 and y-coordinates of the bundle's successive ring and middle fingertips ascending along arrow 604. The open palm model 600A may include y-coordinates of the bundle's successive middle and index fingertips descending along arrow 606. The pattern of the three arrows 602, 604, and 606 may be ascending twice and descending once, indicating a proper open palm model 600A. In an example, the open palm model 600B may represent the second possible proper open palm model with arrows 608, 610, and 612 representing y-coordinates of a right hand bundle's successive fingertips in an ascending then twice descending pattern.

In another example, areas surrounded by the fingertip contour lines may be relatively homogeneous with respect to their color. Color homogeneity may be used to determine properness of an open palm model. In an example, color homogeneity may be checked by examining whether a variance in the Cr-Cb, H or S color descriptions is bounded in a finger. This procedure may be repeated for additional fingers. In an example, a threshold may be used for a single finger, a plurality of fingers, or all four fingers in an open palm model. If the threshold is exceeded for one or more of these groups, the open palm model may be considered proper or valid. In another example, the open palm model properness may be determined using the distances between the mean values in the Cr-Cb, H or S color descriptions between fingers are bounded.

In another example, before applying the angle-between-fingertips and properness heuristics a candidate bundle may be rotated so that the reference fingers that are used for the properness determination are in an upright position. This may help to ensure that the properness determination is robust against possible rotations of the open palm pose. In an example, the total rotation that may be used by the technique may be determined by angle bounds used by the coarse search technique described above.

In an example, a bundle that passes the properness determination may be ranked according to combined edge distance or color homogeneity metrics against other bundles that pass the properness determination. A result of the ranking may include using the highest ranking bundle or bundles in the open palm model. In another example, the number of intermediate bundles considered by this technique may be large (e.g., 100-1000), and the technique may be split between multiple processing units.

Figure 7:
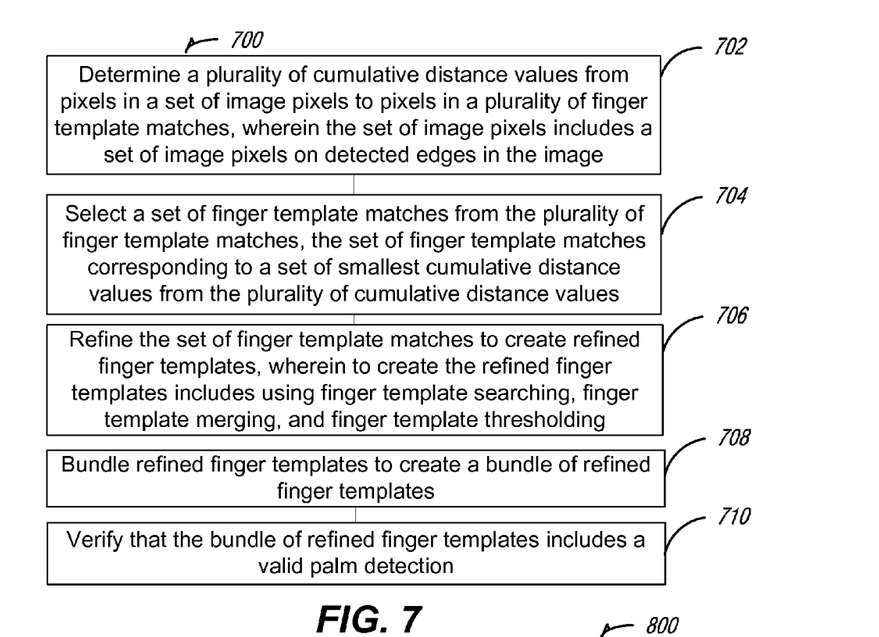
FIG. 7 illustrates generally a flowchart showing a method for detecting a palm of a hand using an image in accordance with some embodiments.

FIG. 7 illustrates generally a flowchart showing a method 700 for detecting a palm of a hand using an image in accordance with some embodiments. The method 700 may include an operation 702 to determine a plurality of cumulative distance values from pixels in a set of image pixels to pixels in a plurality of finger template matches, wherein the set of image pixels includes a set of image pixels on detected edges in the image. The operation 702 may include wherein the plurality of finger template matches includes a plurality of individual finger template matches. For example, the individual finger template matches may include a specified number of finger templates (e.g., one, four, etc.). In an example, the method 700 may further comprise detecting edges in the image using color channel data. For example, the color channel data may include at least one of red, green, blue, y-luminance, chromatic red, chromatic blue, and saturation.

The method 700 may include an operation 704 to select a set of finger template matches from the plurality of finger template matches, the set of finger template matches corresponding to a set of smallest cumulative distance values from the plurality of cumulative distance values. In an example, the operation 704 includes wherein the plurality of cumulative distance values include an average squared distance of the pixels in the set of image pixels to the pixels in the plurality of finger template matches.

The method 700 may include an operation 706 to refine the set of finger template matches to create refined finger templates, wherein to create the refined finger templates includes using finger template searching, finger template merging, and finger template thresholding. In an example, finger template searching, finger template merging, and finger template thresholding includes finger template searching, finger template merging, and finger template thresholding on a scale, an angle, or a distance heuristic. For example, a scale heuristic may include performing a computation on a length of a finger template, a threshold distance heuristic may include performing a computation on a maximum or minimum distance between finger templates (e.g., between fingertips of finger templates), and an angle heuristic may include performing a computation on a maximum or minimum distance between finger templates.

The method 700 may include an operation 708 to bundle refined finger templates to create a bundle of refined finger templates. The operation 708 may include bundling refined finger templates using a scale, a distance, or an angle heuristic. The method 700 may include an operation 710 to verify that the bundle of refined finger templates includes a valid palm detection. In an example, the operation 710 may include verifying that the bundle of refined finger templates includes a valid palm detection by determining that the refined finger templates includes a specified number of refined finger templates (e.g., one, four, etc.). In another example, the operation 710 includes verifying that the bundle of refined finger templates includes a valid palm detection by determining whether color in the specified number of refined finger templates is substantially homogeneous. In another example, the operation 710 includes verifying that the bundle of refined finger templates includes a valid palm detection by determining ordered length differences between consecutive finger templates in the specified number of refined finger templates, wherein a length difference includes distance from an axis to a centroid coordinate of a fingertip. For example, the operation 710 may include verifying that the bundle of refined finger templates includes a valid open palm detection by verifying that the ordered length differences include a positive length difference and two negative length differences consecutively or include two positive length differences and a negative length difference consecutively.

Figure 8:
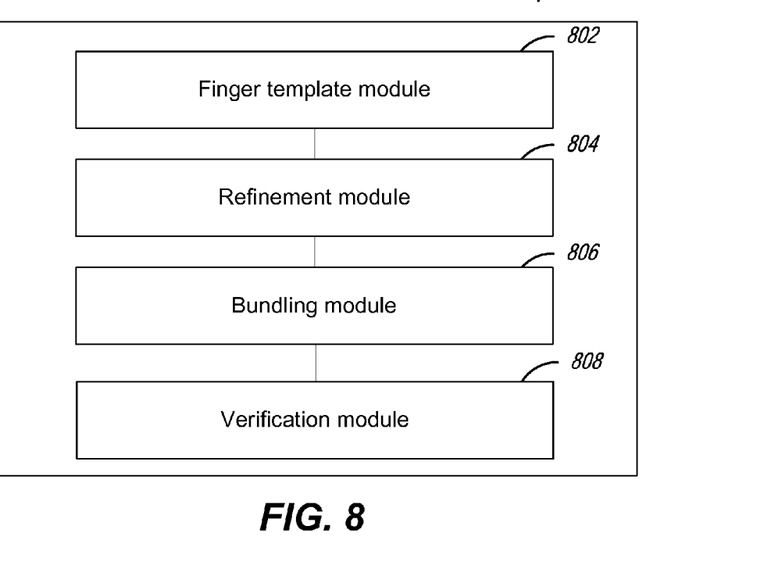
FIG. 8 is a schematic drawing illustrating an open palm detection system, according to an embodiment.

FIG. 8 is a schematic drawing illustrating a valid palm detection system 800, according to an embodiment. In an example, the valid palm detection system may include a finger template module 802. The finger template module 802 may determine a plurality of cumulative distance values from pixels in a set of image pixels to pixels in a plurality of finger template matches, wherein the set of image pixels includes a set of image pixels on detected edges in the image, and select a set of finger template matches from the plurality of finger template matches, the set of finger template matches corresponding to a set of smallest cumulative distance values from the plurality of cumulative distance values.

In an example, the finger template module 802 may determine if fingers are present in the image using a coarse search of a single template, wherein the single template is an average template of a plurality of templates in a database. In another example, the finger template module 802 may pre-determine the set of selected finger template matches. The detected edges may include edges detected using color channel data. The color channel data may include at least one of red, green, blue, y-luminance, chromatic red, chromatic blue, or saturation.

The valid palm detection system 800 may include a refinement module 804. The refinement module 804 may refine the set of finger template matches to create refined finger templates, wherein to create the refined finger templates includes using finger template searching, merging, and thresholding. In an example, the refinement module 804 may iterate refining by refining the refined finger templates using finger template searching, finger template merging, and finger template thresholding.

In another example, the refinement module 804 may iterate refining by reducing a refinement interval by half after each successive refinement, wherein the refinement interval includes a number of pixels or an angle, comparing the plurality of cumulative distance values from pixels in the set of image pixels to pixels in a first finger template match and to pixels in a second finger template match, wherein the first and second finger template matches are in the plurality of finger template matches, and wherein the second finger template match is determined by increasing or decreasing a parameter of the first finger template match according to a refinement interval, the refinement interval including at least one of a location, a scale, or an angle value. In yet another example, the second finger template match may include a different shape than the first finger template match. The refined finger templates may include a plurality of shapes. The plurality of shapes may be stored using a tree data structure of refined finger template shape families in a database.

The valid palm detection system 800 may include a bundling module 806. The bundling module 806 may create a bundle of refined finger templates from the refined finger templates. In an example, the bundling module 806 may use a scale, a distance, or an angle heuristic to create the bundle. In another example, the bundling module 806 may determine a plurality of possible bundles of at least one and fewer than six finger template matches, wherein each possible bundle in the plurality of possible bundles satisfies at least one of a scale, a distance, or an angle heuristic for all finger template matches in the possible bundle.

The valid palm detection system 800 may include a verification module 808. The verification module 808 may verify that the bundle of refined finger templates includes a valid palm detection. In an example, the verification module 808 is to determine that the bundle of refined finger templates includes a specified number of finger templates. For example, the verification module 808 may determine whether color in the specified number of finger templates is substantially homogeneous. In another example, the verification module 808 may determine ordered length differences between consecutive refined finger templates in the bundle of refined finger templates, wherein a length difference includes distance from an axis to a centroid coordinate of a fingertip. For example, the verification module 808 may verify that the ordered length differences include a positive length difference and two negative length differences consecutively or two positive length differences and a negative length difference consecutively.

Figure 9:
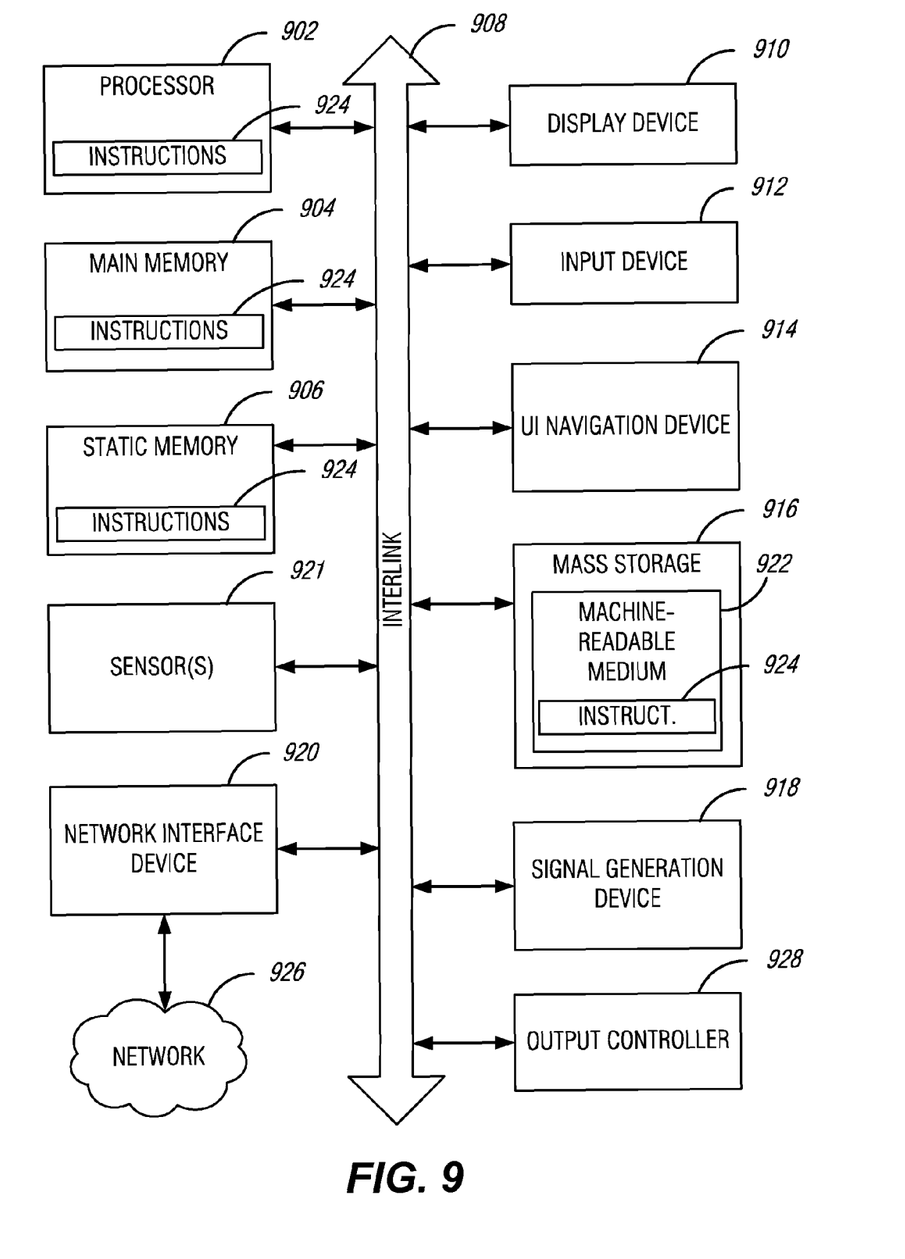
FIG. 9 illustrates generally an example of a block diagram of a machine upon which any one or more of the techniques (e.g., methodologies) discussed herein may perform in accordance with some embodiments.

FIG. 9 illustrates generally an example of a block diagram of a machine 900 upon which any one or more of the techniques (e.g., methodologies) discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 includes the subject matter embodied by a system to detect a palm of a hand using an image, the system comprising: a finger template module to: determine a plurality of cumulative distance values from pixels in a set of image pixels to pixels in a plurality of finger template matches, wherein the set of image pixels includes a set of image pixels on detected edges in the image, and select a set of finger template matches from the plurality of finger template matches, the set of finger template matches corresponding to a set of smallest cumulative distance values from the plurality of cumulative distance values, a refinement module to refine the set of finger template matches to create refined finger templates, wherein to create the refined finger templates includes using finger template searching, merging, and thresholding, a bundling module to create a bundle of refined finger templates from the refined finger templates, and a verification module to verify that the bundle of refined finger templates includes a valid palm detection.

In Example 2, the subject matter of Example 1 may optionally include wherein the finger template module is to determine if fingers are present in the image using a coarse search of a single template, wherein the single template is an average template of a plurality of templates in a database.

In Example 3, the subject matter of one or any combination of Examples 1-2 may optionally include wherein the finger template module is to pre-determine the set of selected finger template matches.

In Example 4, the subject matter of one or any combination of Examples 1-3 may optionally include wherein the refinement module is to iterate refining by refining the refined finger templates using finger template searching, merging, and thresholding.

In Example 5, the subject matter of one or any combination of Examples 1-4 may optionally include wherein to iterate refining, the refinement module is to: reduce a refinement interval by half after each successive refinement, wherein the refinement interval includes a number of pixels or an angle, compare the plurality of cumulative distance values from pixels in the set of image pixels to pixels in a first finger template match and to pixels in a second finger template match, wherein the first and second finger template matches are in the plurality of finger template matches, and wherein the second finger template match is determined by increasing or decreasing a parameter of the first finger template match according to a refinement interval, the refinement interval including at least one of a location, a scale, or an angle value.

In Example 6, the subject matter of one or any combination of Examples 1-5 may optionally include wherein the second finger template match includes a different shape than the first finger template match.

In Example 7, the subject matter of one or any combination of Examples 1-6 may optionally include wherein the refined finger templates include a plurality of shapes, the plurality of shapes stored using a tree data structure of refined finger template shape families.

In Example 8, the subject matter of one or any combination of Examples 1-7 may optionally include wherein the plurality of cumulative distance values include an average squared distance of the pixels in the set of image pixels to the pixels in the plurality of finger template matches.

In Example 9, the subject matter of one or any combination of Examples 1-8 may optionally include wherein the detected edges include edges detected using color channel data, the color channel data including at least one of red, green, blue, y-luminance, chromatic red, chromatic blue, and saturation.

In Example 10, the subject matter of one or any combination of Examples 1-9 may optionally include wherein to create the bundle, the bundling module is to use a scale, a distance, or an angle heuristic.

In Example 11, the subject matter of one or any combination of Examples 1-10 may optionally include wherein to create the bundle, the bundling module is to determine a plurality of possible bundles of at least one and fewer than six finger template matches, wherein each possible bundle in the plurality of possible bundles satisfies at least one of a scale, a distance, or an angle heuristic for all finger template matches in the possible bundle.

In Example 12, the subject matter of one or any combination of Examples 1-11 may optionally include wherein to verify that the bundle of refined finger templates includes the valid palm detection, the verification module is to determine that the bundle of refined finger templates includes a specified number of finger templates.

In Example 13, the subject matter of one or any combination of Examples 1-12 may optionally include wherein to verify that the bundle of refined finger templates includes the valid palm detection, the verification module is to determine whether color in the specified number of finger templates is substantially homogeneous.

In Example 14, the subject matter of one or any combination of Examples 1-13 may optionally include wherein to verify that the bundle of refined finger templates includes the valid palm detection, the verification module is to determine ordered length differences between consecutive refined finger templates in the bundle of refined finger templates, wherein a length difference includes distance from an axis to a centroid coordinate of a fingertip.

In Example 15, the subject matter of one or any combination of Examples 1-14 may optionally include wherein to verify that the bundle of refined finger templates includes the valid palm detection, the verification module is to verify that the ordered length differences include a sequence of a positive length difference and two consecutive negative length differences or a sequence of two consecutive positive length differences and a negative length difference.

Example 16 includes the subject matter embodied by a method to detect a palm of a hand using an image, the method comprising: determining, at a processor, a plurality of cumulative distance values from pixels in a set of image pixels to pixels in a plurality of finger template matches, wherein the set of image pixels includes a set of image pixels on detected edges in the image, selecting a set of finger template matches from the plurality of finger template matches, the set of finger template matches corresponding to a set of smallest cumulative distance values from the plurality of cumulative distance values, refining the set of finger template matches to create refined finger templates, wherein to create the refined finger templates includes using finger template searching, finger template merging, and finger template thresholding, bundling refined finger templates to create a bundle of refined finger templates, and verifying that the bundle of refined finger templates includes a valid palm detection.

In Example 17, the subject matter of Example 16 may optionally include further comprising detecting edges in the image using color channel data.

In Example 18, the subject matter of one or any combination of Examples 16-17 may optionally include wherein the color channel data includes at least one of red, green, blue, y-luminance, chromatic red, chromatic blue, and saturation.

In Example 19, the subject matter of one or any combination of Examples 16-18 may optionally include further comprising determining if fingers are present in the image using a coarse search of a single template, wherein the single template is an average template of a plurality of templates in a database.

In Example 20, the subject matter of one or any combination of Examples 16-19 may optionally include further comprising pre-determining the set of selected finger template matches.

In Example 21, the subject matter of one or any combination of Examples 16-20 may optionally include further comprising iterating refining by refining the refined finger templates using finger template searching, merging, and thresholding.

In Example 22, the subject matter of one or any combination of Examples 16-21 may optionally include wherein iterating refining includes: reducing a refinement interval by half after each successive refinement, wherein the refinement interval includes a number of pixels or an angle, comparing the plurality of cumulative distance values from pixels in the set of image pixels to pixels in a first finger template match and to pixels in a second finger template match, wherein the first and second finger template matches are in the plurality of finger template matches, and wherein the second finger template match is determined by increasing or decreasing a parameter of the first finger template match according to a refinement interval, the refinement interval including at least one of a location, a scale, or an angle value.

In Example 23, the subject matter of one or any combination of Examples 16-22 may optionally include wherein the second finger template match includes a different shape than the first finger template match.

In Example 24, the subject matter of one or any combination of Examples 16-23 may optionally include wherein the refined finger templates include a plurality of shapes, the plurality of shapes stored using a tree data structure of refined finger template shape families.

In Example 25, the subject matter of one or any combination of Examples 16-24 may optionally include wherein the plurality of cumulative distance values include an average squared distance of the pixels in the set of image pixels to the pixels in the plurality of finger template matches.

In Example 26, the subject matter of one or any combination of Examples 16-25 may optionally include wherein creating the bundle includes determining a plurality of possible bundles of at least one and fewer than six finger template matches, wherein each possible bundle in the plurality of possible bundles satisfies at least one of a scale, a distance, or an angle heuristic for all finger template matches in the possible bundle.

In Example 27, the subject matter of one or any combination of Examples 16-26 may optionally include wherein verifying that the refined palm template includes a valid palm detection includes determining that the bundle of refined finger templates includes a specified number of finger templates.

In Example 28, the subject matter of one or any combination of Examples 16-27 may optionally include wherein verifying that the bundle of refined finger templates includes the valid palm detection includes determining whether color in the specified number of finger templates is substantially homogeneous.

In Example 29, the subject matter of one or any combination of Examples 16-28 may optionally include wherein verifying that the bundle of refined finger templates includes the valid palm detection includes determining ordered length differences between consecutive refined finger templates in the bundle of refined finger templates, wherein a length difference includes distance from an axis to a centroid coordinate of a fingertip.

In Example 30, the subject matter of one or any combination of Examples 16-29 may optionally include wherein verifying that the bundle of refined finger templates includes the valid palm detection includes verifying that the ordered length differences include a sequence of a positive length difference and two consecutive negative length differences or a sequence of two consecutive positive length differences and a negative length difference.

Example 31 includes at least one machine-readable medium including instructions for receiving information, which when executed by a machine, cause the machine to perform any of the methods of Examples 16-30.

Example 32 includes an apparatus comprising means for performing any of the methods of Examples 16-30.

Example 33 includes the subject matter embodied by an apparatus comprising: means for determining, at a processor, a plurality of cumulative distance values from pixels in a set of image pixels to pixels in a plurality of finger template matches, wherein the set of image pixels includes a set of image pixels on detected edges in an image, means for selecting a set of finger template matches from the plurality of finger template matches, the set of finger template matches corresponding to a set of smallest cumulative distance values from the plurality of cumulative distance values, means for refining the set of finger template matches to create refined finger templates, wherein to create the refined finger templates includes using finger template searching, finger template merging, and finger template thresholding, means for bundling refined finger templates to create a bundle of refined finger templates, and means for verifying that the bundle of refined finger templates includes a valid palm detection.

In Example 34, the subject matter of Example 33 may optionally include further comprising means for detecting edges in the image using color channel data.

In Example 35, the subject matter of one or any combination of Examples 33-34 may optionally include wherein the color channel data includes at least one of red, green, blue, y-luminance, chromatic red, chromatic blue, and saturation.

In Example 36, the subject matter of one or any combination of Examples 33-35 may optionally include further comprising means for determining if fingers are present in the image using a coarse search of a single template, wherein the single template is an average template of a plurality of templates in a database.

In Example 37, the subject matter of one or any combination of Examples 33-36 may optionally include further comprising means for pre-determining the set of selected finger template matches.

In Example 38, the subject matter of one or any combination of Examples 33-37 may optionally include further comprising means for iterating refining by refining the refined finger templates using finger template searching, merging, and thresholding.

In Example 39, the subject matter of one or any combination of Examples 33-38 may optionally include wherein the means for iterating refining include: means for reducing a refinement interval by half after each successive refinement, wherein the refinement interval includes a number of pixels or an angle, means for comparing the plurality of cumulative distance values from pixels in the set of image pixels to pixels in a first finger template match and to pixels in a second finger template match, wherein the first and second finger template matches are in the plurality of finger template matches, and wherein the second finger template match is determined by increasing or decreasing a parameter of the first finger template match according to a refinement interval, the refinement interval including at least one of a location, a scale, or an angle value.

In Example 40, the subject matter of one or any combination of Examples 33-39 may optionally include wherein the second finger template match includes a different shape than the first finger template match.

In Example 41, the subject matter of one or any combination of Examples 33-40 may optionally include wherein the refined finger templates include a plurality of shapes, the plurality of shapes stored using a tree data structure of refined finger template shape families.

In Example 42, the subject matter of one or any combination of Examples 33-41 may optionally include wherein the plurality of cumulative distance values include an average squared distance of the pixels in the set of image pixels to the pixels in the plurality of finger template matches.

In Example 43, the subject matter of one or any combination of Examples 33-42 may optionally include wherein the means for creating the bundle include means for determining a plurality of possible bundles of at least one and fewer than six finger template matches, wherein each possible bundle in the plurality of possible bundles satisfies at least one of a scale, a distance, or an angle heuristic for all finger template matches in the possible bundle.

In Example 44, the subject matter of one or any combination of Examples 33-43 may optionally include wherein the means for verifying that the refined palm template includes a valid palm detection include means for determining that the bundle of refined finger templates includes a specified number of finger templates.

In Example 45, the subject matter of one or any combination of Examples 33-44 may optionally include wherein the means for verifying that the bundle of refined finger templates includes the valid palm detection include means for determining whether color in the specified number of finger templates is substantially homogeneous.

In Example 46, the subject matter of one or any combination of Examples 33-45 may optionally include wherein the means for verifying that the bundle of refined finger templates includes the valid palm detection include means for determining ordered length differences between consecutive refined finger templates in the bundle of refined finger templates, wherein a length difference includes distance from an axis to a centroid coordinate of a fingertip.

In Example 47, the subject matter of one or any combination of Examples 33-46 may optionally include wherein the means for verifying that the bundle of refined finger templates includes the valid palm detection include means for verifying that the ordered length differences include a sequence of a positive length difference and two consecutive negative length differences consecutively or a sequence of two consecutive positive length differences and a negative length difference.

The above detailed description includes references to the accompanying drawings, which form a part of the detailed description. The drawings show, by way of illustration, specific embodiments. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. A system to detect a palm of a hand using an image, the system comprising:
    a finger template module to:
        determine a plurality of cumulative distance values from pixels in a set of image pixels to pixels in a plurality of finger template matches, wherein the set of image pixels includes a set of image pixels on detected edges in the image;
        select a set of finger template matches from the plurality of finger template matches, the set of finger template matches corresponding to a set of smallest cumulative distance values from the plurality of cumulative distance values;
    a refinement module to refine the set of finger template matches to create refined finger templates, wherein to create the refined finger templates includes using finger template searching, merging, and thresholding;
    a bundling module to create a bundle of refined finger templates from the refined finger templates; and
    a verification module to verify that the bundle of refined finger templates includes a valid palm detection.

2. The system of claim 1, wherein the finger template module is to determine if fingers are present in the image using a coarse search of a single template, wherein the single template is an average template of a plurality of templates in a database.

3. The system of claim 1, wherein the finger template module is to pre-determine the set of selected finger template matches.

4. The system of claim 1, wherein the refinement module is to iterate refining by refining the refined finger templates using finger template searching, merging, and thresholding.

5. The system of claim 4, wherein to iterate refining, the refinement module is to:
    reduce a refinement interval by half after each successive refinement, wherein the refinement interval includes a number of pixels or an angle;
    compare the plurality of cumulative distance values from pixels in the set of image pixels to pixels in a first finger template match and to pixels in a second finger template match, wherein the first and second finger template matches are in the plurality of finger template matches; and
    wherein the second finger template match is determined by increasing or decreasing a parameter of the first finger template match according to a refinement interval, the refinement interval including at least one of a location, a scale, or an angle value.

6. The system of claim 5, wherein the second finger template match includes a different shape than the first finger template match.

7. The system of claim 5, wherein the refined finger templates include a plurality of shapes, the plurality of shapes stored using a tree data structure of refined finger template shape families.

8. The system of claim 1, wherein the plurality of cumulative distance values include an average squared distance of the pixels in the set of image pixels to the pixels in the plurality of finger template matches.

9. The system of claim 1, wherein the detected edges include edges detected using color channel data, the color channel data including at least one of red, green, blue, y-luminance, chromatic red, chromatic blue, and saturation.

10. The system of claim 1, wherein to create the bundle, the bundling module is to use a scale, a distance, or an angle heuristic.

11. The system of claim 1, wherein to create the bundle, the bundling module is to determine a plurality of possible bundles of at least one and fewer than six finger template matches, wherein each possible bundle in the plurality of possible bundles satisfies at least one of a scale, a distance, or an angle heuristic for all finger template matches in the possible bundle.

12. The system of claim 1, wherein to verify that the bundle of refined finger templates includes the valid palm detection, the verification module is to determine that the bundle of refined finger templates includes a specified number of finger templates.

13. At least one non-transitory machine-readable medium including instructions for receiving information, which when executed by a machine, cause the machine to:
    determine a plurality of cumulative distance values from pixels in a set of image pixels to pixels in a plurality of finger template matches, wherein the set of image pixels includes a set of image pixels on detected edges in the image; and
    select a set of finger template matches from the plurality of finger template matches, the set of finger template matches corresponding to a set of smallest cumulative distance values from the plurality of cumulative distance values;
    refine the set of finger template matches to create refined finger templates, wherein to create the refined finger templates includes using finger template searching, finger template merging, and finger template thresholding;

bundle refined finger templates to create a bundle of refined finger templates; and verify that the bundle of refined finger templates includes a valid palm detection.

14. The machine-readable medium of claim 13, further comprising operations to detect edges in the image using color channel data.

15. The machine-readable medium of claim 14, wherein the color channel data includes at least one of red, green, blue, y-luminance, chromatic red, chromatic blue, and saturation.

16. The machine-readable medium of claim 13, wherein operations to bundle refined finger templates to create the bundle include operations to bundle refined finger templates using a scale, a distance, or an angle heuristic.

17. The machine-readable medium of claim 13, further comprising operations to determine if fingers are present in the image using a coarse search of a single template, wherein the single template is an average template of a plurality of templates in a database.

18. The machine-readable medium of claim 13, wherein the plurality of cumulative distance values include an average squared distance of the pixels in the set of image pixels to the pixels in the plurality of finger template matches.

19. The machine-readable medium of claim 13, wherein operations to create the bundle include operations to determine a plurality of possible bundles of at least one and fewer than six finger template matches, wherein each possible bundle in the plurality of possible bundles satisfies at least one of a scale, a distance, or an angle heuristic for all finger template matches in the possible bundle.

20. The machine-readable medium of claim 13, wherein operations to verify that the refined palm template includes a valid palm detection include operations to determine that the bundle of refined finger templates includes a specified number of finger templates.

21. The machine-readable medium of claim 20, wherein operations to verify that the bundle of refined finger templates includes the valid palm detection include operations to determine whether color in the specified number of finger templates is substantially homogeneous.

22. The machine-readable medium of claim 20, wherein operations to verify that the bundle of refined finger templates includes the valid palm detection include operations to determine ordered length differences between consecutive refined finger templates in the bundle of refined finger templates, wherein a length difference includes distance from an axis to a centroid coordinate of a fingertip.

23. The machine-readable medium of claim 22, wherein operations to verify that the bundle of refined finger templates includes the valid palm detection include operations to verify that the ordered length differences include a sequence of a positive length difference and two consecutive negative length differences or a sequence of two consecutive positive length differences and a negative length difference.

24. A method to detect a palm of a hand using an image, the method comprising:

determining, at a processor, a plurality of cumulative distance values from pixels in a set of image pixels to pixels in a plurality of finger template matches, wherein the set of image pixels includes a set of image pixels on detected edges in the image;

selecting a set of finger template matches from the plurality of finger template matches, the set of finger template matches corresponding to a set of smallest cumulative distance values from the plurality of cumulative distance values;

refining the set of finger template matches to create refined finger templates, wherein to create the refined finger templates includes using finger template searching, finger template merging, and finger template thresholding;

bundling refined finger templates to create a bundle of refined finger templates; and verifying that the bundle of refined finger templates includes a valid palm detection.

25. The method of claim 24, further comprising detecting edges in the image using color channel data, wherein the color channel data includes at least one of red, green, blue, y-luminance, chromatic red, chromatic blue, and saturation.

* * * * *